US010000932B2

(12) United States Patent
De Wilde

(10) Patent No.: US 10,000,932 B2
(45) Date of Patent: Jun. 19, 2018

(54) DEVICE FOR FIXING A GUTTER TO A BUILDING CONSTRUCTION, BUILDING CONSTRUCTION WITH SUCH A DEVICE, FIXING MEMBER, SUPPORT MEMBER

(71) Applicant: Jarola Vision B.V., Lutten (NL)

(72) Inventor: Gerrit Jan De Wilde, Anerveen (NL)

(73) Assignee: JAROLA VISION B.V., Lutten (NL)

( * ) Notice: Subject to any disclaimer, the term of this patent is extended or adjusted under 35 U.S.C. 154(b) by 0 days. days.

(21) Appl. No.: 15/310,977

(22) PCT Filed: May 12, 2015

(86) PCT No.: PCT/NL2015/050330
§ 371 (c)(1),
(2) Date: Nov. 14, 2016

(87) PCT Pub. No.: WO2015/174831
PCT Pub. Date: Nov. 19, 2015

(65) Prior Publication Data
US 2017/0089072 A1    Mar. 30, 2017

(30) Foreign Application Priority Data
May 14, 2014  (NL) ...................................... 2012816

(51) Int. Cl.
*E04B 1/38* (2006.01)
*E04D 13/072* (2006.01)

(52) U.S. Cl.
CPC ................... *E04D 13/0727* (2013.01)

(58) Field of Classification Search
CPC .................................................. E04D 13/0727
(Continued)

(56) References Cited

U.S. PATENT DOCUMENTS 707,941 A * 8/1902 Pope .................... E04D 13/0722
248/297.31
1,558,385 A * 10/1925 Meunier ............. E04D 13/0722
248/48.1
(Continued)

FOREIGN PATENT DOCUMENTS

EP         0317032 A1   5/1989
FR          884660 A    8/1943
(Continued)

OTHER PUBLICATIONS

International Preliminary Report on Patentability dated Nov. 24, 2016 for PCT Application, PCT/NL2015//050330 filed May 12, 2015.
(Continued)

*Primary Examiner* — Basil S Katcheves

(57) ABSTRACT

The invention relates to a device for fixing a gutter to a building construction, and a building construction with such a device, the device comprising: —a fixing member for arranging fixedly on the building construction; —a support member releasably connectable to the fixing member for supporting the gutter, the support member comprising two connecting elements extending at an angle to each other, wherein: —a first connecting element of the two connecting elements is configured to be connected releasably to the fixing member and extends substantially parallel to the building construction, and—the second connecting element is configured to be connected to the gutter and extends substantially vertically. The invention further relates to a building construction with a number of such devices, and to such a fixing member and support member.

13 Claims, 5 Drawing Sheets

(58) Field of Classification Search
USPC .................................. 52/698, 11, 8; 248/48.1
See application file for complete search history.

(56) References Cited

U.S. PATENT DOCUMENTS

| | | | | | |
|---|---|---|---|---|---|
| 3,126,038 | A | * | 3/1964 | Jaworski | F16B 37/044 411/112 |
| 3,809,347 | A | * | 5/1974 | Pekarek | E04D 13/0725 248/300 |
| 4,000,587 | A | * | 1/1977 | Weber | E04D 13/0725 248/48.1 |
| 4,553,357 | A | * | 11/1985 | Pepper | E04D 13/0722 248/299.1 |
| 4,676,706 | A | * | 6/1987 | Inaba | F16B 37/041 411/175 |
| 4,940,198 | A | * | 7/1990 | de Wilde | E04D 13/0722 248/48.1 |
| 2011/0014010 | A1 | | 1/2011 | Degraan | |

FOREIGN PATENT DOCUMENTS

| | | | |
|---|---|---|---|
| FR | 1474956 | A | 3/1967 |
| FR | 1497813 | A | 10/1967 |
| FR | 2769934 | A1 | 4/1999 |
| GB | 670947 | A | 4/1952 |

OTHER PUBLICATIONS

International Search Report and Written Opinion dated Aug. 27, 2015 for PCT Application No. PCT/NL2015/050330 filed May 12, 2015.

* cited by examiner

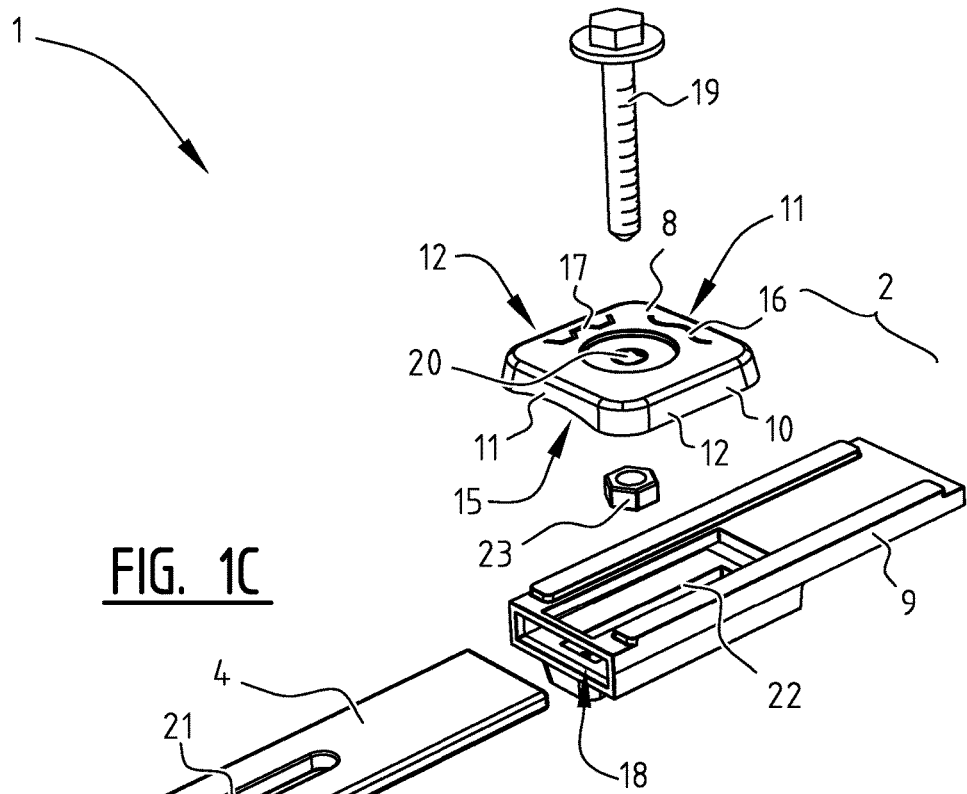
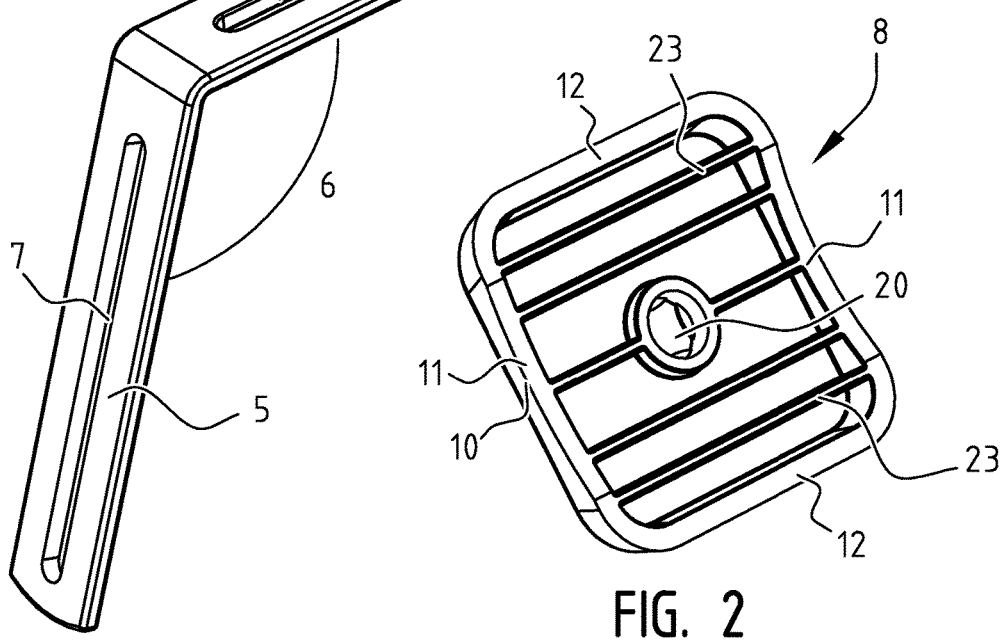

DEVICE FOR FIXING A GUTTER TO A BUILDING CONSTRUCTION, BUILDING CONSTRUCTION WITH SUCH A DEVICE, FIXING MEMBER, SUPPORT MEMBER

The invention relates to a device for fixing a gutter to a building construction, the device comprising:
a fixing member for arranging fixedly on the building construction;
a support member releasably connectable to the fixing member for supporting the gutter, the support member comprising two connecting elements extending at an angle to each other, wherein:
a first connecting element of the two connecting elements is configured to be connected releasably to the fixing member and, in the situation arranged on the building construction, extends substantially parallel to the building construction, and
the second connecting element is configured to be connected to the gutter and, in the situation arranged on the building construction, extends substantially vertically.

Such a device is known for instance from the European patent publication with number EP 0 317 032 B1.

It is an object of the invention to improve the device of EP 0 317 032 B1. It is a particular object of the invention to improve the device of EP 0 317 032 B1 such that it can be utilized more flexibly, for instance for several types of building construction.

This object is achieved with a device according to any of the claims 2-11 or a combination thereof.

A building construction is understood to mean any construction to which a gutter can be fixed. A building construction is particularly understood to mean a (sloping) roof, more particularly a (corrugated) sheet roof or trapezoidal sheeting.

The fixing member can be attached fixedly to the building construction using fixing means, for instance though not limited thereto, in the form of a bolt and nut.

In an embodiment of the device according to the invention the fixing element comprises a peripheral edge, wherein the peripheral edge has a shape adapted to the building construction.

Such a peripheral edge with a shape adapted to the building construction provides the advantage that the fixing element can be connected to the building construction so as to fit substantially against it. Because the fixing element fits against the building construction, the fixing element can be firmly connected thereto.

In another embodiment of the device according to the invention two first opposite sides of the peripheral edge have a shape adapted to a first type of building construction and two second opposite sides of the peripheral edge have a shape adapted to a second, other type of building construction.

The two first opposite sides of the peripheral edge more particularly have a shape adapted to a first type of building construction for the purpose of arranging the fixing element in a first orientation on the first type of building construction, and the two second opposite sides of the peripheral edge have a shape adapted to a second, other type of building construction for the purpose of arranging the fixing element in a second orientation on the second type of building construction.

An advantage of such a peripheral edge is that the fixing element can be disposed substantially fitting on two different types of building construction and can therefore be connected firmly thereto. The fixing element can be arranged for this purpose in two different orientations on the building construction, wherein in a first orientation of the fixing element the first sides of the peripheral edge fit substantially against the building construction of the first type, and in a second orientation of the fixing element the second sides of the peripheral edge fit substantially against the building construction of the second type.

The first type of building construction can for instance, though not exclusively, be a corrugated sheet and the second type of building construction can for instance, though not exclusively, be a trapezoidal sheet. It will be apparent that the fixing element can be made suitable for any type of building construction by selecting a suitable shape of the peripheral edge.

In order to indicate the suitable placing orientation per type of building construction the fixing element can comprise a first marking for indicating the first placing orientation of the fixing element for the first type of building construction and a second marking for indicating the second placing orientation of the fixing element for the second type of building construction.

In yet another embodiment of the device according to the invention the two first opposite sides have a substantially circular or oval free edge or recess therein, which free edge or recess forms a fitting surface for fitting at least partially against the first type of building construction.

Such a circular or oval free edge or recess in the edge forms a circular or oval fitting surface for at least partial fitting against a circular or oval surface of the building construction, whereby this fixing element is particularly suitable for fixing to a corrugated sheet. The radius and/or dimension of the circular or oval free edge or recess in the edge is preferably selected such that it is suitable for different types of corrugated sheet of different radii and/or dimensions. That is, the radius and/or dimension of the circular or oval free edge or recess in the edge is selected in accordance with the largest available radius and/or dimension of a (standard) commercially available corrugated sheet. For corrugated sheets of a smaller radius and/or dimension than the radius and/or dimension of the circular or oval free edge or recess in the edge, the free edge or recess will not fit with its whole fitting surface against the corrugation of the corrugated sheet but only with a part thereof. Applicant has found that, even in the case of partial fitting, a sufficiently strong connection can be provided between the fixing element and the corrugated sheet.

The two second opposite sides can have a substantially straight free edge or recess therein, which free edge or recess forms a fitting surface for at least partial fitting against the second type of building construction.

Such a straight free edge or recess in the edge is suitable for a building construction with an at least partially straight or flat surface, such as a flat plate or trapezoidal sheet. The dimension of the straight free edge or recess can here also be selected in accordance with a dimension of a profile of the building construction.

In yet another embodiment of the device according to the invention the fixing element comprises a number of strengthening ribs disposed parallel to the second opposite sides and extending over a least a part of the length of the fixing element.

Such strengthening ribs extending parallel to the second opposite sides provide the advantage that they impart stiffness to the fixing element in a direction substantially at a right angle to the strengthening ribs, and impart some flexibility to the fixing element in a direction substantially parallel to the strengthening ribs. The fixing element, and in particular the substantially circular or oval edge or recess in the edge, can hereby be shaped to some extent to the first type of building construction.

In yet another embodiment of the device according to the invention the fixing member comprises a second fixing element configured to be disposed on a side of the building construction opposite the (first) fixing element and to be connected to the (first) fixing element such that the building construction extends between the (first) fixing element and the second fixing element.

Because the building construction extends between the (first) fixing element and second fixing element disposed on either side thereof, a firm connection can be realized between the fixing member and the building construction.

In practical manner the second fixing element can comprise a receiving space for receiving the first connecting element of the support member. Because the first connecting element of the support member is received in the receiving space of the second fixing element, the support member can be easily connected to the fixing member.

Using the device according to the invention a gutter can be disposed in simple manner at a freely chosen sloping incline in that the second connecting element has an angle relative to the first connecting element which is suitable for suspension of the gutter. The first connecting element extends substantially parallel here to the building construction and the second connecting element extends substantially vertically.

The fixing element and/or the second fixing element and/or the support member can for instance be manufactured from plastic or metal. In order to provide the required strength the support member is embodied in practical manner from steel with a thickness of 2-6 mm, for instance 4 mm.

For substantially vertical arrangement of the second connecting element the angle between the two connecting elements must be correctly chosen. This is achieved in that the angle between the two connecting elements is adapted to the angle of inclination of the building construction. The angle between the two connecting elements is equal here to the obtuse angle between the building construction and the vertical.

The fixing member and the support member of the device according to the invention can for instance be supplied separately of each other to a user, wherein a number of support members with mutually differing angles between the two connecting elements are made available to the user so that the user can select and use a support member with a correct angle between the two connecting elements for his/her building construction.

In an embodiment of the device according to the invention the two connecting elements are connected to each other such that the angle between the two is adjustable.

Such a device provides the advantage that the support member is suitable for building constructions with any random angle of inclination, wherein the angle between the two connecting elements is set subject to the angle of inclination of the relevant building construction. The two connecting elements can for instance be connected pivotally to each other.

In yet another embodiment of the device according to the invention the first connecting element comprises an elongate slot, wherein the first connecting element can be connected to the (first) fixing element and optionally the second fixing element by arranging a bolt in the slot via an opening in the (first) fixing element and securing the bolt at a chosen position in the slot using a nut.

The slot provides the advantage that the connecting element can be connected at a suitable location to the (first) fixing element.

For connection of the gutter to the device according to the invention the second connecting element comprises an elongate slot, wherein the gutter can be connected to the second connecting element by arranging a bolt connected to the gutter in the slot and securing the bolt at a chosen position in the slot using a nut.

The gutter can for instance be connected for this purpose to a per se known and freely available fixing bracket, which fixing bracket has at least one opening which can be disposed in register with the slot of the second connecting element so that the bolt can be arranged through the opening and the slot and can be firmly attached using a nut. This slot also provides the advantage that the fixing bracket can be connected at a suitable location to the second connecting element.

The invention also relates to a building construction comprising a number of fixedly arranged devices as described above distributed along the length of the building construction, wherein the number of devices together support a gutter.

The invention also relates to a fixing member for a device for fixing a gutter as described to a building construction, which fixing member can be arranged fixedly on the building construction.

In an embodiment of the fixing member according to the invention the fixing member comprises a fixing element with a peripheral edge having a shape adapted to the building construction, wherein two first opposite sides of the peripheral edge have a shape adapted to a first type of building construction for the purpose of arranging the fixing element in a first orientation on the first type of building construction, and wherein two second opposite sides of the peripheral edge have a shape adapted to a second, other type of building construction for the purpose of arranging the fixing element in a second orientation on the second type of building construction.

The advantages of such a fixing member have already been elucidated above with reference to the device according to the invention.

In another embodiment of the fixing member according to the invention the fixing element comprises a first marking for indicating a first placing orientation of the fixing element for the first type of building construction and a second marking for indicating a second placing orientation of the fixing element for the second type of building construction.

The advantages of such a fixing member have already been elucidated above with reference to the device according to the invention.

The invention also relates to a support member for a device for fixing a gutter to a building construction as described above.

As described above, it is advantageous for the fixing member and the support member to be supplied separately of each other so that the support member can have an angle adapted to the angle of inclination of the building construction.

The invention will be further elucidated with reference to the figures shown in the drawing, in which:

FIGS. 1A-1C show respectively a perspective view (FIG. 1A), a perspective cut-away view (FIG. 1B) and a perspective exploded view (FIG. 1C) of the device according to the invention;

FIG. 2 shows a bottom view of a fixing member according to the invention;

Figure 1A:
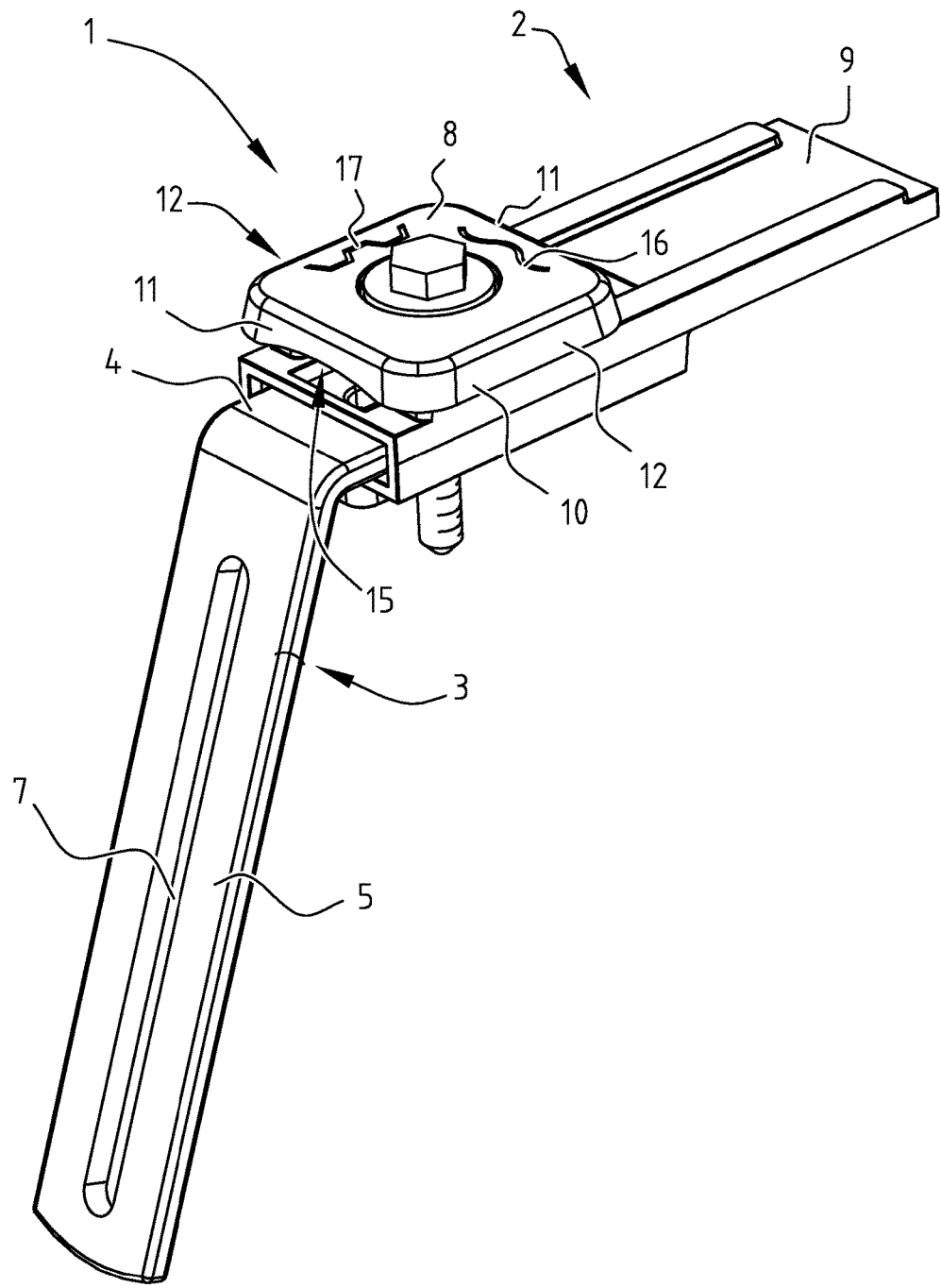
Figure 1B:
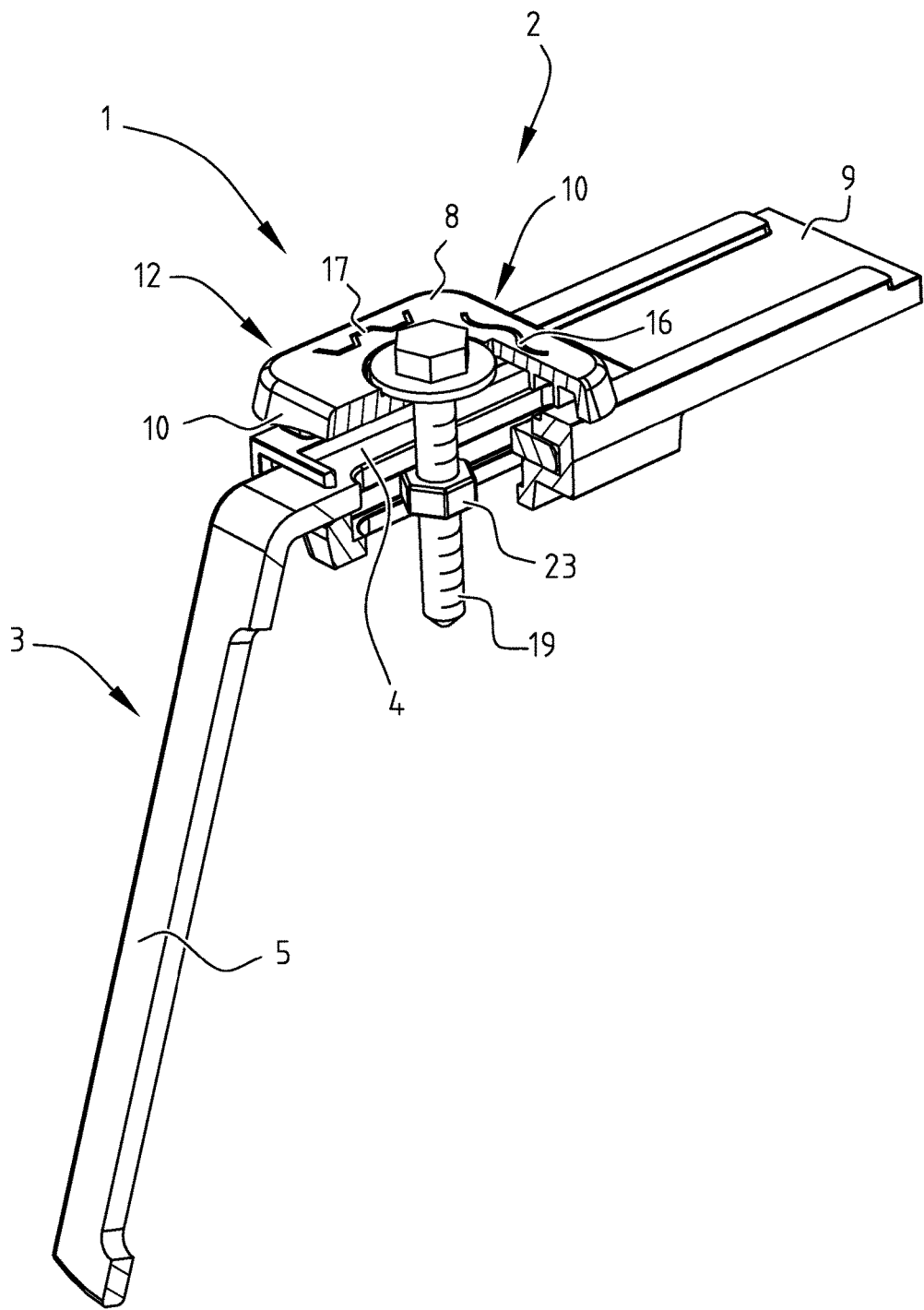
Figure 3:
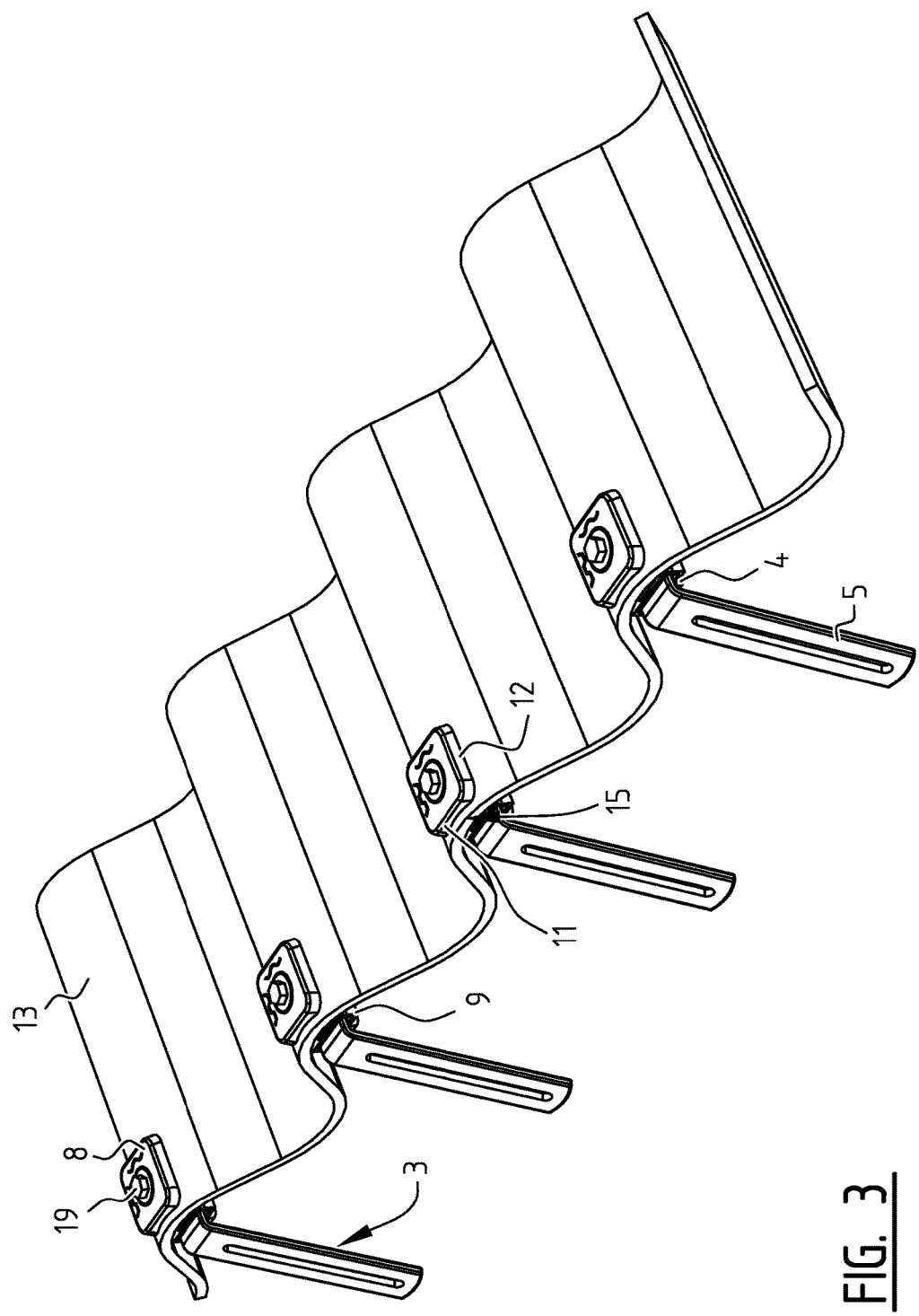
FIG. 3 shows the device of FIG. 1 in a situation fixed to a first type of building construction.
Figure 4:
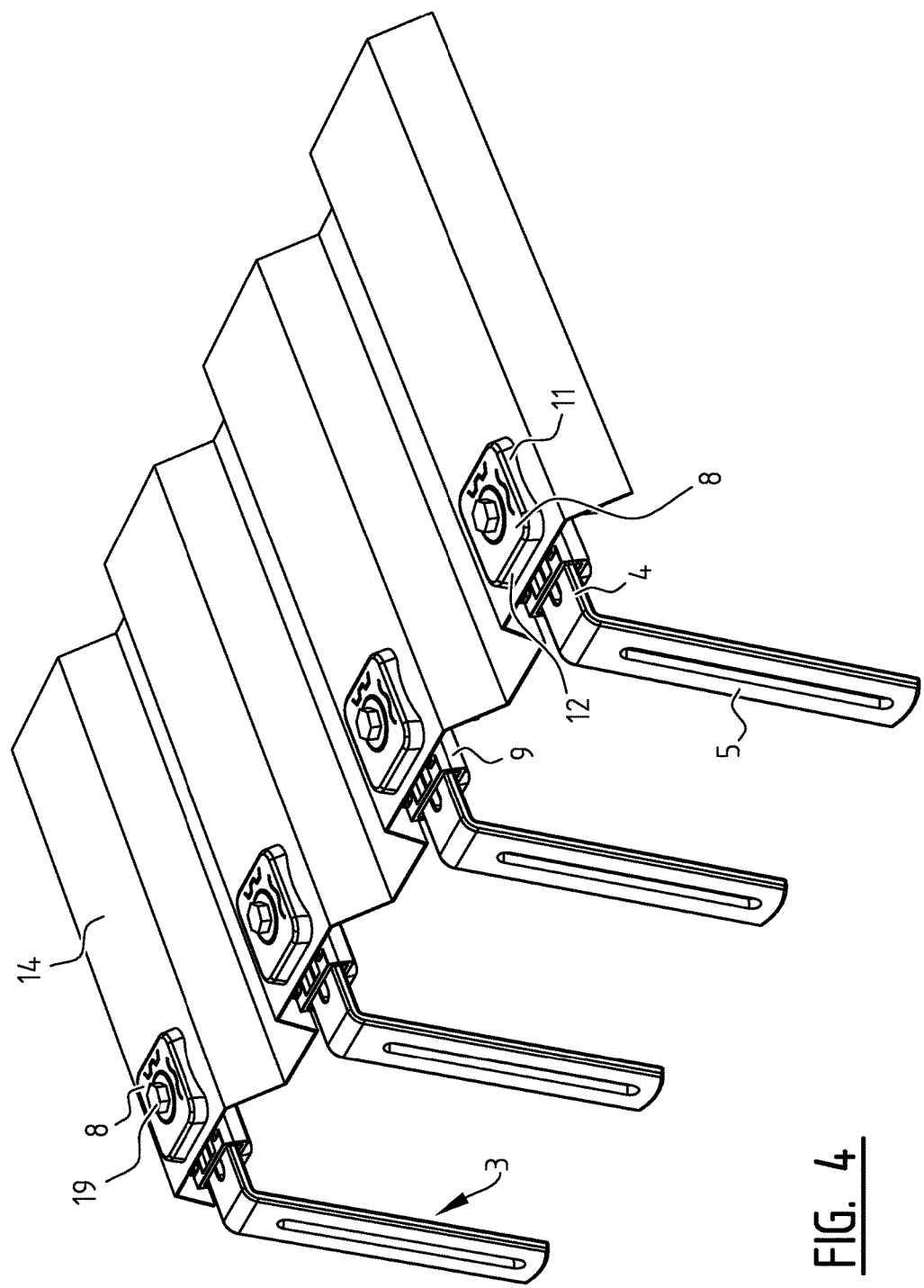
FIG. 4 shows the device of FIG. 1 in a situation fixed to a second type of building construction.

FIGS. 1A-1C show a device 1 for fixing a gutter to a building construction. Device 1 comprises a fixing member 2 which can be attached to the building construction and a support member 3 which is connected to fixing member 2 and which can support the gutter. As shown in FIGS. 1A-1C, support member 3 comprises two connecting elements 4, 5 extending at an angle to each other, wherein a first connecting element 4 is connected to fixing member 2 and wherein second connecting element 5 can be connected to the gutter using a fixing bracket (not shown). The fixing bracket can be a generally commercially available fixing bracket which can be attached to support member 3 with two bolts and nuts at a chosen position in a slot 7 in the second connecting element 5 thereof. The angle 6 between the two connecting elements 4, 5 is adapted to the angle of inclination of the building construction such that first connecting element 4 extends substantially parallel to the building construction and second connecting element 5 extends substantially vertically, see also FIGS. 3 and 4. Since in view of rain and other precipitation the building construction is normally disposed sloping downward to at least some extent, the angle 6 is usually greater than 90°. The angle 6 can particularly lie between about 100° and about 160°.

As shown in FIGS. 1A-1C, 3 and 4, fixing member 2 comprises a first fixing element 8 and a second fixing element 9. First fixing element 8 comprises a peripheral edge 10 with a shape adapted to building construction 13, 14. Two first opposite sides 11 of peripheral edge 10 have a shape adapted to a first type of building construction 13 and two second opposite sides 12 of peripheral edge 10 have a shape adapted to a second, other type of building construction 14. In the shown embodiment the first type of building construction 13 is a corrugated sheet roof and the second type of building construction 14 is a trapezoidal sheet. The two first opposite sides 11 have a substantially circular recess 15 which, with a correct first orientation of first fixing element 8, lies against a wave-like peak of building construction 13, see FIG. 3. Because circular recess 15 lies against the wave-like peak, a firm connection to building construction 13 can be provided. The two second opposite sides 12 have a substantially straight free edge which, with a correct second orientation of first fixing element 8, lies against a block wave-like peak of building construction 14, see FIG. 4. Because the straight edge of the second opposite sides 12 lies against the flat block wave-like peak, a strong connection to building construction 14 can be provided. In order to determine the correct first or second orientation the first fixing element 8 comprises respectively a first marking 16 and a second marking 17. First marking 16 is a wave shape for the purpose of indicating that in the first orientation the first fixing element 8 is suitable for fitting against a corrugated sheet roof, and second marking 17 is a block wave shape for the purpose of indicating that in the first orientation the first fixing element 8 is suitable for fitting against a trapezoidal sheet.

Second fixing element 9 comprises a receiving space 18 for receiving first connecting element 4 of support member 3. In order to be received therein the first connecting element 4 can be arranged by sliding in receiving space 18. As will be apparent from FIGS. 3 and 4, first fixing element 8 and second fixing element 9, when arranged on building construction 13, 14, will be disposed on either side of building construction 13, 14.

Attachment of support member 3 to building construction 13, 14 takes place by sliding first connecting element 4 into receiving space 18 of second fixing element 9. The first connecting element can be arranged here at any desired and suitable distance in receiving space 18. First and second fixing elements 8, 9 are then disposed on either side of building construction 13, 14, after which a bolt 19 is arranged through a circular opening 20 in first fixing element 8, an elongate slot 21 of first connecting element 4 and an elongate slot 22 of second fixing element 9. Bolt 19 is then secured using a nut 23. Using the elongate slots 21, 22 the first fixing element 8 can be connected at a suitable position in slots 21, 22 to first connecting element 4 and second fixing element 9. It is noted that the above steps for fixing support member 3 to the building construction can be performed in any suitable sequence.

FIG. 2 shows an underside of first fixing element 8. This shows that first fixing element 8 comprises a number of strengthening ribs 23 disposed parallel to the second opposite sides 12. Strengthening ribs 23 impart stiffness to first fixing element 8 in a direction substantially at a right angle to strengthening ribs 23 and some flexibility in a direction substantially parallel to strengthening ribs 23. The second opposite sides 12 can hereby be displaced to some extent toward each other, whereby the radius of circular recess 15 can decrease to some extent and thus be adapted to some extent to a radius of the wave-like peak of a corrugated sheet roof.

It is noted that the invention is not limited to the shown embodiments but also extends to variants within the scope of the appended claims.

It will thus be apparent to the skilled person that, although the support member is shown with a fixed angle between the two connecting elements, the two connecting elements can alternatively be connected to each other such that the angle between the two is adjustable.

The invention claimed is:

1. A device for fixing a gutter to a building construction, the device comprising:
   a fixing member for arranging fixedly on the building construction;
   a support member releasably connectable to the fixing member for supporting the gutter, the support member comprising two connecting elements extending at an angle to each other, wherein:
   a first connecting element of the two connecting elements is configured to be connected releasably to the fixing member and, when arranged on the building construction, extends substantially parallel to the building construction, and
   the second connecting element is configured to be connected to the gutter and, when the device for fixing a gutter to a building construction is fixed to the building construction, the second connecting element extends substantially vertically,
   wherein the fixing member comprises a first fixing element including first, second, third and fourth sides defining a peripheral edge, wherein the first and third opposite sides have a first shape including a longitudinal concave recess adapted to nest with a first type of building construction, so that the first fixing element in a first orientation can be connected to said first type of building construction so as to fit substantially against it, and wherein the second and fourth opposite sides have a second, different shape having a substantially straight surface adapted to nest with a second, other type of building construction, so that the first fixing element in a second orientation can be connected to said second, other type of building construction so as to fit substantially against it.

2. The device as claimed in claim 1, wherein the first fixing element comprises a first marking for indicating a first placing orientation of the first fixing element for the first type of building construction and a second marking for indicating a second placing orientation of the first fixing element for the second type of building construction.

3. The device as claimed in claim 1, wherein the first fixing element comprises a number of strengthening ribs disposed parallel to the second and fourth opposite sides and extending over a least a part of the length of the first fixing element.

4. The device as claimed in claim 1, wherein the fixing member comprises a second fixing element configured to be disposed on a side of the building construction opposite the first fixing element and to be connected to the first fixing element such that the building construction extends between the first fixing element and the second fixing element.

5. The device as claimed in claim 4, wherein the second fixing element comprises a receiving space for receiving the first connecting element of the support member.

6. The device as claimed in claim 1, wherein the angle between the first and second connecting elements is adapted to the angle of inclination of the building construction.

7. The device as claimed in claim 1, wherein the first and second connecting elements are connected to each other such that the angle therebetween is adjustable.

8. The device as claimed in claim 1, wherein the first connecting element comprises an elongate slot, and wherein the first connecting element can be connected to the first fixing element and the second fixing element by arranging a bolt in the slot via an opening in the first fixing element and securing the bolt at a chosen position in the slot using a nut.

9. The device as claimed in claim 1, wherein the second connecting element comprises an elongate slot, and wherein the gutter can be connected to the second connecting element by arranging a bolt connected to the gutter in the slot and securing the bolt at a chosen position in the slot using a nut.

10. The building construction, comprising a number of fixedly arranged devices as claimed in claim 1, distributed along the length of the building construction, wherein the number of fixedly arranged devices together support a gutter.

11. The fixing member as claimed in claim 1 for fixing a gutter to a building construction, which fixing member can be arranged fixedly on the building construction.

12. The fixing member as claimed in claim 11, wherein the fixing element has a first marking for indicating the first orientation of the fixing element for the first type of building construction and a second marking for indicating the second orientation of the fixing element for the second type of building construction.

13. The support member as claimed in claim 1, for fixing a gutter to a building construction.

* * * * *